United States Patent
Kim (10) Patent No.: US 9,516,603 B2
(45) Date of Patent: Dec. 6, 2016

(54) COMMUNICATION DEVICE FOR COMMUNICATING USING TV WHITE SPACE AND METHOD THEREOF

(71) Applicant: SAMSUNG ELECTRONICS CO., LTD., Suwon-si (KR)

(72) Inventor: Dae-ki Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 128 days.

(21) Appl. No.: 14/507,359

(22) Filed: Oct. 6, 2014

(65) Prior Publication Data

US 2015/0148092 A1 May 28, 2015

(30) Foreign Application Priority Data

Nov. 22, 2013 (KR) ......................... 10-2013-0142861

(51) Int. Cl.
*H04W 52/24* (2009.01)
*H04W 52/36* (2009.01)
*H04W 52/52* (2009.01)
*H04W 52/22* (2009.01)
*H04W 52/50* (2009.01)

(52) U.S. Cl.
CPC ......... *H04W 52/226* (2013.01); *H04W 52/228* (2013.01); *H04W 52/50* (2013.01)

(58) Field of Classification Search
CPC ....... H04B 52/00; H04B 10/293; H04W 52/04
See application file for complete search history.

(56) References Cited

U.S. PATENT DOCUMENTS

| | | | | |
|---|---|---|---|---|
| 8,694,047 B2 * | 4/2014 | Yang | ...................... | G06F 1/266 370/252 |
| 8,971,942 B2 * | 3/2015 | Lambert | .............. | H04W 72/048 455/452.1 |
| 9,179,322 B2 * | 11/2015 | Roberts | ................. | H04W 16/14 |
| 2011/0090887 A1 * | 4/2011 | Kim | ...................... | H04W 16/14 370/338 |
| 2012/0202510 A1 * | 8/2012 | Singh | ...................... | H04W 4/20 455/452.1 |
| 2013/0016670 A1 * | 1/2013 | Shellhammer | ........ | H04W 16/14 370/329 |
| 2013/0148517 A1 * | 6/2013 | Abraham | ................. | H04B 7/12 370/252 |
| 2014/0378127 A1 * | 12/2014 | Garnett | ............... | H04W 52/247 455/426.1 |

(Continued)

*Primary Examiner* — Bobbak Safaipour
(74) *Attorney, Agent, or Firm* — Sughrue Mion, PLLC (57) ABSTRACT

A communication device is provided. The communication device includes: a transceiver configured to communicate with a counterpart communication device using a television (TV) white space; a measurer configured to measure power of a signal received from the counterpart communication device; a memory configured to store information corresponding to an initial power level; and a controller configured to determine a transmission power level based on the power measured by the measurer and control the transceiver to communicate with the counterpart communication device while gradually increasing a transmission power of a signal transmitted to the counterpart communication device from the initial power level to the transmission power level. Accordingly, the effect on surrounding broadcast receiving apparatuses can be minimized.

16 Claims, 6 Drawing Sheets

(56) References Cited

U.S. PATENT DOCUMENTS

2015/0156735 A1* 6/2015 Goto ................ H04W 52/54
                                                455/522
2015/0373554 A1* 12/2015 Freda ............... H04W 16/14
                                                455/450

* cited by examiner

COMMUNICATION DEVICE FOR COMMUNICATING USING TV WHITE SPACE AND METHOD THEREOF

CROSS-REFERENCE TO RELATED APPLICATION(S)

This application claims the priority from Korean Patent Application No. 10-2013-0142861, filed on Nov. 22, 2013, in the Korean Intellectual Property Office, the disclosure of which is incorporated herein by reference in its entirety.

BACKGROUND

1. Field

Apparatuses and methods consistent with exemplary embodiments relate to a communication device and a communication method thereof, and more particularly, to a communication device for communicating using television (TV) white space, and a communication method thereof.

2. Description of the Related Art

As various wireless Internet-based applications such as open type terminal platforms, application stores, mobile Voice over Internet Protocols (VoIP), etc. have been increasingly used, demands for wireless data communication is quickly increasing. Accordingly, it is expected that demands for frequencies, over which to perform the wireless data communication, will also increase.

However, frequency resources are limited and thus using new frequencies to meet the increasing demands is also limited. Accordingly, a frequency sharing method has been highlighted as one of the methods for enhancing frequency efficiency. In particular, a method for enhancing frequency efficiency using TV white space is being actively discussed.

The TV white space refers to an empty frequency band that is not used by broadcasters from among Very High Frequency (VHF) and Ultra High Frequency (UHF) bands distributed for TV broadcasting. Specifically, the TV white space refers to a frequency band that is spatially empty considering any possible frequency interference among broadcasters, a frequency band that is not used in a region, or a frequency band that is used in a region where airwaves do not reach. In addition, the TV white space refers to a broadcasting frequency that is empty during a time slot at which the broadcaster does not transmit broadcasting, for example, at dawn.

Currently, the TV white space is a unlicensed band that anyone can use if conditions for government's regulations on radio waves are satisfied. Specifically, a condition that should be satisfied before using a frequency band in the TV white space is that a device should not influence TV broadcasting.

According to a related-art communication method, a communication device measures power received from a counterpart communication device that it wishes to communicate with and tries an initial transmission with a corresponding power. In this case, the initial transmission of the corresponding power is performed in a burst manner and thus communication in the TV white space may cause instantaneous saturation of a radio frequency (RF) amplifier in a tuner of a TV, which may cause distortion in TV signals.

Accordingly, there is a demand for a method for minimizing an effect on broadcast reception of a TV in communicating using TV white space.

SUMMARY

One or more exemplary embodiments may overcome the above disadvantages and other disadvantages not described above. However, it is understood that one or more exemplary embodiment are not required to overcome the disadvantages described above, and an exemplary embodiment may not overcome any of the problems described above.

One or more exemplary embodiments provide a communication device which can minimize effects on surrounding broadcast receiving apparatuses when communicating in a white space in a TV broadcasting band, and a communication method thereof.

According to an aspect of an exemplary embodiment, there is provided a communication device including: a transceiver configured to communicate with a counterpart communication device using a television (TV) white space; a measurer configured to measure power of a signal received from the counterpart communication device; a memory configured to store an initial power level; and a controller configured to determine a transmission power level based on the power measured by the measurer and control the transceiver to communicate with the counterpart communication device while gradually increasing a transmission power of a signal transmitted to the counterpart communication device from the initial power level to the transmission power level.

The controller may be further configured to determine a change of the transmission power level and control the transceiver to communicate with the counterpart communication device while gradually changing the transmission power of the signal transmitted to the counterpart communication device from the transmission power level to the changed transmission power level.

The controller may be further configured to detect a communication timeout, reset the transmission power to the initial power level, and control the transceiver to communicate with the counterpart communication device while gradually increasing the transmission power from the initial power level to the transmission power level.

The controller may be further configured to increase the transmission power from the initial power level to the transmission power level gradually by increment in which a TV broadcast receiving apparatus adaptively adjust a gain according to a level of transmission power of a signal transmitted and received through the TV white space between the communication device and the counterpart communication device.

According to an aspect of another exemplary embodiment, there is provided a communication method of a communication device using a television (TV) white space, the communication method including: measuring power of a signal received from a counterpart communication device; determining a transmission power level based on the measured power; and communicating with the counterpart communication device while gradually increasing a transmission power of a signal transmitted to the counterpart communication device from a predetermined initial power level to the transmission power level.

The method may further include determining a change of the transmission power level and communicating with the counterpart communication device while gradually changing the transmission power of the signal transmitted to the counterpart communication device from the transmission power level to the changed transmission power level.

The method may further include detecting a communication timeout, resetting the transmission power to the initial power level, and communicating with the counterpart communication device while gradually increasing the transmission power from the initial power level to the transmission power level.

The communicating comprises increasing the transmission power from the initial power level to the transmission power level gradually by increment in which a TV broadcast receiving apparatus adaptively adjust a gain according to a level of transmission power of a signal transmitted and received through the TV white space between the communication device and the counterpart communication device.

Accordingly to an aspect of another exemplary embodiment, there is provided a communication device including: a transceiver configured to communicate with a counterpart communication device through a television (TV) white space frequency band; and a controller configured to determine a transmission power level and an initial transmission power level corresponding to the counterpart communication device and communicate with the counterpart communication device while gradually increasing a transmission power of a signal transmitted to the counterpart communication device from the initial power level to the transmission power level.

The controller may be further configured to determine a change of the transmission power level and control the transceiver to communicate with the counterpart communication device while gradually changing the transmission power of the signal transmitted to the counterpart communication device from the transmission power level to the changed transmission power level.

The controller may be further configured to detect a communication timeout, reset the transmission power to the initial power level, and control the transceiver to communicate with the counterpart communication device while gradually increasing the transmission power from the initial power level to the transmission power level.

The controller may be further configured to increase the transmission power from the initial power level to the transmission power level gradually by increment in which a TV broadcast receiving apparatus adaptively adjust a gain according to a level of transmission power of a signal transmitted and received through the TV white space between the communication device and the counterpart communication device.

The controller may be further configured to determine the initial power level and the transmission power level based on data stored in the communication device.

The controller may be further configured to determine the initial power level and the transmission power level based on a power of a signal received from the counterpart communication device.

A memory and the controller may be integrated as a system-on-chip.

According to an aspect of another exemplary embodiment, there is provided a communication device including: a transceiver; and a controller configured to control the transceiver to gradually increase a transmission power of a signal transmitted to a counterpart communication device though a television (TV) white space frequency band.

The controller may be further configured to control the transceiver to gradually increase the transmission power of the signal from an initial power level to a transmission power level.

The controller may be further configured to determine the initial power level and the transmission power level.

The controller may be further configured to determine the initial power level and the transmission power level based on data related to an operational parameter of the counterpart communication device stored in the communication device.

The controller may be further configured to determine the initial power level and the transmission power level based on a power of a signal received from the counterpart communication device.

According to the above-described various exemplary embodiments, the communication device can minimize the effects on the broadcast reception of the broadcast receiving apparatus when communicating in the white space in the TV broadcasting band.

BRIEF DESCRIPTION OF THE DRAWINGS

The above and/or other aspects will become more apparent by describing certain exemplary embodiments, with reference to the accompanying drawings, in which.

DETAILED DESCRIPTION OF EXEMPLARY EMBODIMENTS

Hereinafter, certain exemplary embodiments will be described in greater detail with reference to the accompanying drawings.

In the following description, same reference numerals are used for the same elements, even when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

Figure 1:
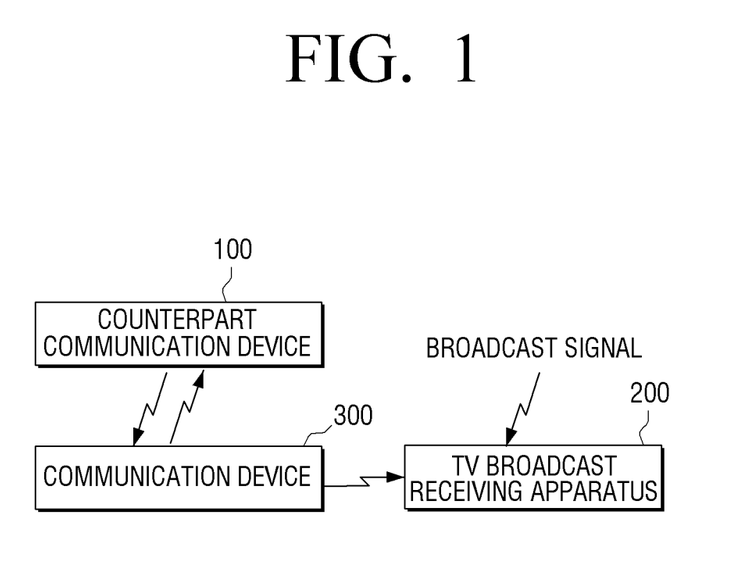
FIG. 1 is a view illustrating a communication device which communicates in a white space in a TV broadcasting band.

FIG. 1 is a view illustrating a configuration of a communication system which communicates using a TV white space.

Referring to FIG. 1, a communication device 300 communicates with a counterpart communication device 100 using a TV white space while a TV broadcast receiving apparatus 200 is receiving broadcast signals.

The communication device 300 may communicate with the counterpart communication device 100 using various communication methods. In addition, the counterpart communication device 100 may be implemented by using various devices such as an access point (AP), a base station, a counterpart terminal device performing peer-to-peer (P2P) communication, etc.

In a related-art communication method, the communication device 300 measures power received from a counterpart device that the communication device 300 intends to communicate with and tries initial transmission with a corresponding power (i.e., a transmission requirement power). In this case, the initial transmission of the communication device 300 is performed in a burst manner.

When the counterpart communication device 100 is an access point in the example of FIG. 1, the communication device 300 measures power of a signal periodically transmitted from the access point and tries initial transmission with a corresponding power (transmission requirement power).

For example, when a signal of +30 dBm (i.e., Decibel-milliwatts) is periodically transmitted from the access point and is measured as +5 dBm by the communication device 300 due to a variety of losses while passing through the air, the communication device determines transmission power considering the loss of 25 dBm.

That is, when the communication device 300 should transmit a signal of 20 dBm, the communication device 300 adds power of 25 dBm, which is the calculated loss, and tries initial transmission with a transmission requirement power of +45 dBm. In this case, the transmission of +45 dBm is performed in the burst manner.

The method of calculating the transmission requirement power of the signal to be transmitted to the counterpart communication device 100 in the above example is merely an example and the transmission requirement power may be calculated using various algorithms or methods.

On the assumption that the above method is used, effects of the burst initial transmission of the communication device communicating in the TV white space on a TV broadcast receiving apparatus (for example, a digital TV) will be explained with reference to FIG. 2. However, the configuration of the TV broadcast receiving apparatus, which is not necessary for explaining the exemplary embodiments, is not described in detail.

Figure 2:
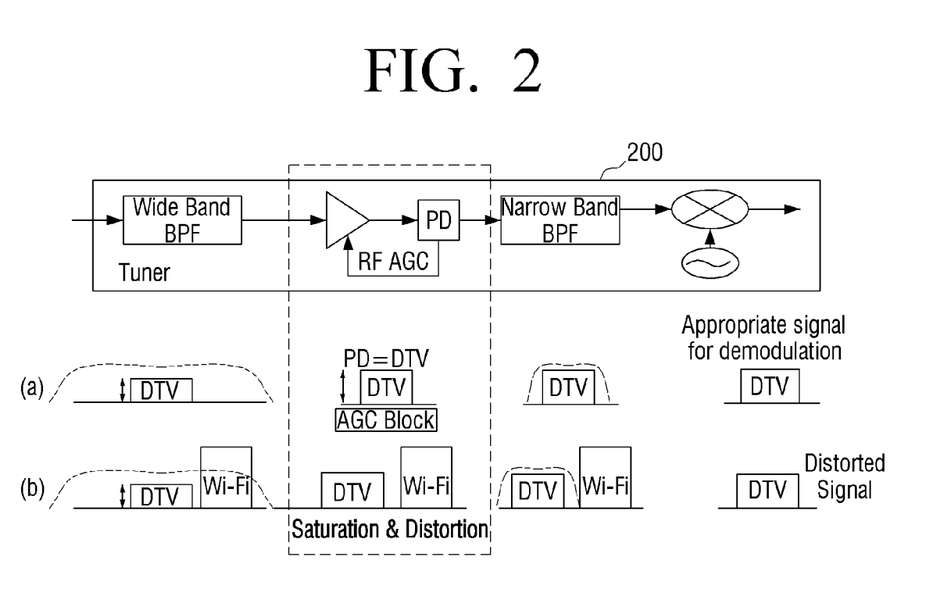
FIG. 2 is a view to illustrate an effect on a broadcast receiving apparatus in a white space in a related-art communication method.

FIG. 2 illustrates configuration and operation of a tuner of a TV broadcast receiving apparatus 200.

View (a) of FIG. 2 illustrates an operation of the tuner of the TV broadcast receiving apparatus when there is no communication using a TV white space, and view (b) of FIG. 2 illustrates an operation of the tuner when a burst initial transmission signal of the communication device 300, which intends to communicate with the counterpart communication device 100 using the TV white space as shown in FIG. 1, enters the tuner of the TV broadcast receiving apparatus 200.

When a broadcast signal (DTV) enters in the normal situation as shown in view (a) of FIG. 2, the signal passes through a wide band filter first and then is amplified through an RF amplifier. In this case, an RF Amplifier Gain Control (AGC) block detects power at an amplifier output end through a power detector (PD), provides feedback on the power, and adjusts a gain of the RF amplifier.

The broadcast signal (DTV), which has been amplified to an appropriate size through the RF amplifier, then passes through a narrow band filter and is down-converted into a frequency for demodulation through a down-converter which includes an oscillator and a mixer. Then, the broadcast signal (DTV) goes through a demodulation process.

On the other hand, in the burst initial transmission of the general communication method of the related art, when the burst initial transmission signal of the communication device 300 abruptly enters the tuner of the TV broadcast receiving apparatus 200 in the TV white space as shown in view (b) of FIG. 2, the signal passes through the wide band filter of the tuner and enters the RF amplifier along with a broadcast signal (DTV).

Since the wide band filter of the tuner of the TV broadcast receiving apparatus 200 passes all signals of the TV broadcasting band from among the signals entering through an antenna, the wide band filter cannot filter out the signal of the communication device 300, which communicates using the TV white space, and passes the signal.

Thereafter, because a signal of the great magnitude (Wi-Fi) abruptly enters the RF amplifier, the RF amplifier does not have an opportunity to reduce the gain and thus is saturated. Due to the saturation of the RF amplifier, the broadcast signal (DTV) entering along with the Wi-Fi signal is also distorted.

Accordingly, in the related art, a narrow band filter passes the distorted broadcast signal (DTV), and, when this signal is down-converted and demodulated into an image, the image is instantaneously distorted.

Accordingly, in the related art, the burst initial transmission of the general communication method using the white space influences the broadcast reception of the digital TV and thus essential conditions for using the frequency of this band are not satisfied.

In this situation, the transmission requirement power may be changed while the communication device is communicating with the counterpart communication device or transmission of the communication device may pause for a predetermined time and then resume.

According to an exemplary embodiment, the communication device 300 may gradually increase the transmission power of the signal to be transmitted to the counterpart communication device 100 from a predetermined initial power level to the transmission requirement power level in order to prevent the above-described effect of the related art on the TV broadcast receiving apparatus 200 during communication using the TV white space.

In this case, the AGC block of the TV broadcast receiving apparatus 200 may adaptively adjust the gain according to transmission power of a signal occurring in the surroundings.

Accordingly, the broadcast signal (DTV) entering along with the Wi-Fi signal can be prevented from being distorted due to the saturation of the RF amplifier which is caused by the burst inflow of the signal.

Figure 3:
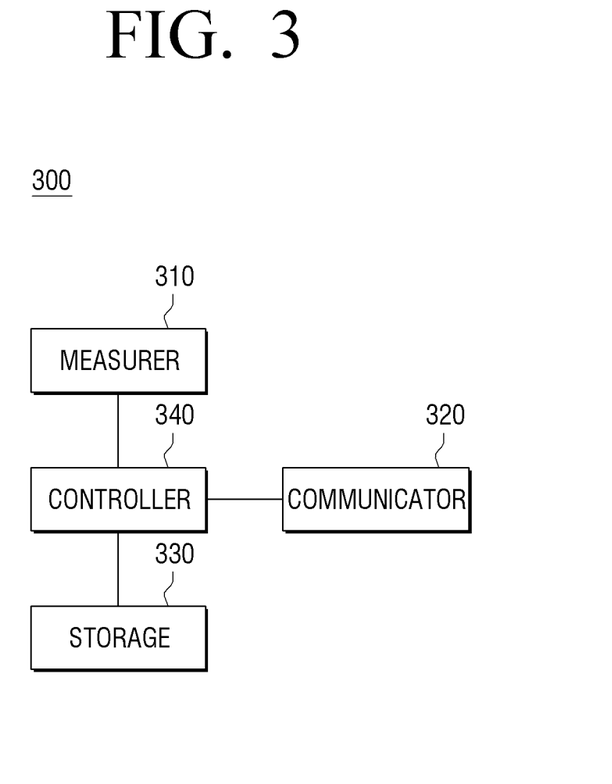
FIG. 3 is a block diagram illustrating a configuration of a communication device according to an exemplary embodiment.

FIG. 3 is a block diagram to illustrate a configuration of a communication device according to an exemplary embodiment. Referring to FIG. 3, the communication device 300 includes a measurer 310, a communicator 320 (i.e., a transceiver), a storage 330 (i.e., memory), and a controller 340.

The measurer 310 measures the power of a signal received from a counterpart communication device (not shown) to determine a transmission requirement power of the communication device 300.

The communication device 300 and the counterpart communication device may vary according to a communication method. For example, when the communication device 300 performs Wi-Fi communication, the counterpart communication device may be an access point (AP) for the Wi-Fi communication. In addition, when the LTE communication method is used, the counterpart communication device may be a base station. In addition, when the P2P communication method is used, the counterpart communication device may be a counterpart's communication terminal.

However, this should not be considered as limiting. Any device that intends to communicate in the TV white space may be the communication device 300 and the counterpart communication device.

Accordingly, the measurer 310 receives the signal transmitted from the counterpart communication device according to a communication method in which the communication device 300 and the counterpart communication device communicate with each other in the TV white space, and measures the power of the signal.

The communicator 320 communicates with the counterpart communication device (not shown) using the TV white space under the control of the controller 340.

Specifically, when the communication device 300 is a Wi-Fi terminal, the communicator 320 communicates with the AP by transmitting and receiving signals in a method according to the Wi-Fi standard. In addition, when the LTE communication is used, a mobile phone may communicate with a base station by transmitting and receiving signals in a method according to the LTE standard. In addition, when the P2P communication is used, such as in a radio, the communicator 320 communicates with the counterpart communication device in a method according to the P2P standard.

That is, the communicator 320 performs communication by transmitting and receiving signals to and from the counterpart communication device according to a communication method that the communicator 320 intends to use to communicate using the TV white space. The communication performing method according to the communication method, which is not necessary for explaining the exemplary embodiments, is not described in detail.

The storage 330 may store various programs and data necessary for operating the communication device 300. In particular, the storage 330 may store a power level of a signal received from the counterpart communication device and a level of power of a signal (i.e., transmission requirement power) to be transmitted to the counterpart communication device, which is calculated by the measurer 310 based on the power level of the received signal, and a program for calculating the power level. In addition, the storage 330 may store data about a predetermined initial power level of the signal to be transmitted to the counterpart communication device, a changed transmission requirement power level when the transmission requirement power is changed, and an increase range of the transmission power to be increased from the initial power level to the transmission requirement power level.

The controller 340 controls an overall operation of the communication device 300. For example, the controller 340 may control the measurer 310 to measure the power of the signal transmitted from the counterpart communication device (not shown) to the communication device to calculate the transmission requirement power of the communication device 300.

In addition, the controller 340 may read out, from the storage 330, the program and data necessary for calculating the transmission requirement power, and may determine the transmission requirement power of the signal to be transmitted from the communication device 300 to the counterpart communication device based on the transmission power of the counterpart communication device measured by the measurer 310. The method for determining the transmission requirement power has been described with reference to FIG. 1 and will not be further described.

The controller 320 may read out, from the storage 330, the program and data needed for the communication device 300 to communicate with the counterpart communication device, and may control the communicator 320 to allow the communication device 300 to communicate with the counterpart communication device (not shown) using the TV white space. The program needed to communicate with the counterpart communication device may vary according to the communication method, as described above in the explanation about the communicator 320.

In particular, when the communication between the communication device 300 and the counterpart communication device is established, the controller 340 may control the communicator 320 to perform communication while gradually increasing the transmission power of the signal to be transmitted to the counterpart communication device from the predetermined initial power level to the transmission requirement power level.

For example, when the transmission requirement power is +30 dBm, the predetermined initial power level is +0 dBm, and the transmission power increase range is +5 dBm, the controller 340 may read out the data stored in the storage 330 and may control the communicator 320 to perform communication, while gradually increasing the transmission power of the signal to be transmitted to the counterpart communication device from +0 dBm to +30 dBm in 5 dBm increments.

The predetermined initial power level of +0 dBm is a minimum power level that is required to transmit the signal when the communication device 300 communicates with the counterpart communication device, and refers to a minimum power level from among power levels set for the transmission. However, this should not be considered as limiting and the predetermined initial power level may set differently according to a communication device or a communication method.

In addition, the increase range of the transmission power, which is set to +5 dBm, is merely an example and may be set to be an increment by which the TV broadcast receiving apparatus can adaptively adjust the gain according to the level of the transmission power of the signal transmitted and received through the white space.

In addition, when the transmission requirement power level is changed during the communication, the controller 340 may control the communicator 320 to perform communication while gradually changing the transmission power, of the signal to be transmitted to the counterpart communication device, from the original transmission requirement power level to the changed transmission requirement power level.

In addition, when the transmission to the counterpart communication device pauses for a predetermined time and then resumes, the controller 340 may set the transmission power to the initial power level again and may control the communicator 340 to perform communication while increasing the transmission power from the initial power level to the transmission requirement power level.

Although FIG. 3 illustrates that the communication device 300 includes the measurer 310 and the storage 330, the measurer 310 and the storage 330 may be omitted according to an exemplary embodiment.

For example, when the controller 340 is in the form of a System on Chip (SoC) including a memory such as a Random Access Memory (RAM), a Read Only Memory (ROM), etc., the data corresponding to the initial transmission power level or a default value for the transmission requirement power level may be stored in the memory. The controller 340 may determine the initial transmission power level and the transmission requirement power level based on such data, and accordingly, may adjust the transmission power of the communicator 320 to gradually increase.

Figure 4:
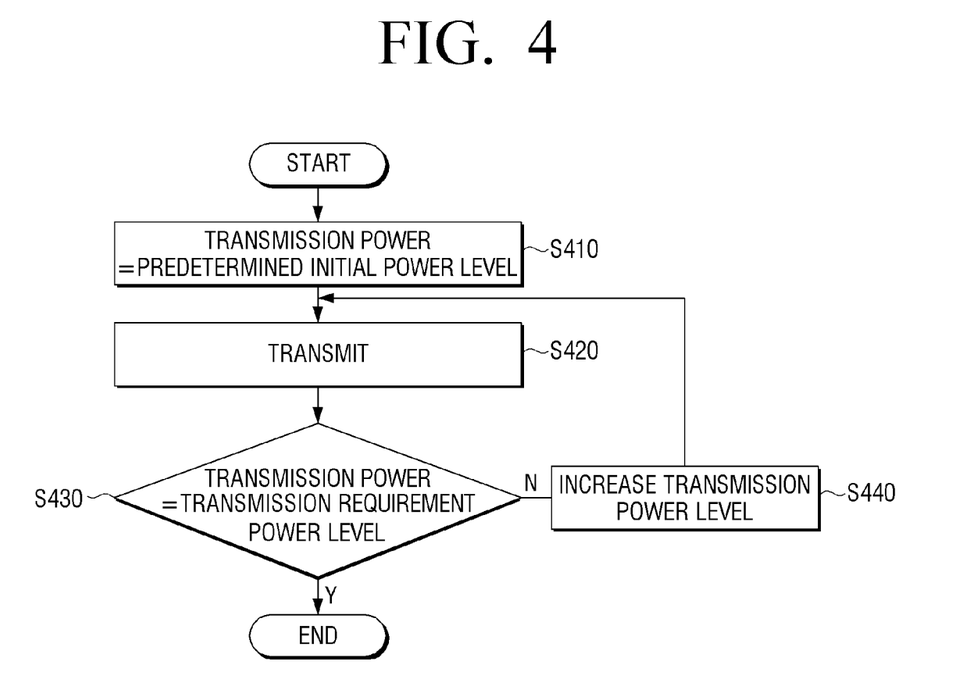
FIG. 4 is a flowchart illustrating a transmitting method of a communication device according to an exemplary embodiment.

FIG. 4 is a flowchart to illustrate a method in which the controller 340 of the communication device 300 controls the communicator 320 to gradually increase the transmission power of the signal to be transmitted to the counterpart communication device (not shown).

When communication between the communication device 300 and the counterpart communication device is established using the TV white space, the controller 340 sets the transmission power to a predetermined initial power level (S410) and controls the communicator 320 to transmit the signal to the counterpart communication device (S420).

The controller 340 determines whether the transmission power of the communicator 320 is equal to the transmission requirement power level (S430). When the transmission power of the communicator 320 is not equal to the transmission requirement power level (S430, N), the controller 340 increases the transmission power level and sets the transmission power level (S440) and then controls the communicator 320 to transmit the signal to the counterpart communication device at the increased transmission power level (S420).

The transmission power is repeatedly increased until the transmission power of the signal transmitted by the communicator 320 is equal to the transmission requirement power level (S430, Y), and, when the transmission power is equal to the transmission requirement power level, the communication device 300 performs communication by transmitting the signal to the counterpart communication device at the transmission requirement power level.

The communication device communicating in the TV white space according to the exemplary embodiments described above can prevent the problem discussed above that may arise from the method of the related-art communication device in the TV white space, that is, a phenomenon in which a TV is temporarily rendered inoperable due to temporary saturation of the RF amplifier in the TV broadcast receiving apparatus and distortion of the broadcast signal.

Figure 5:
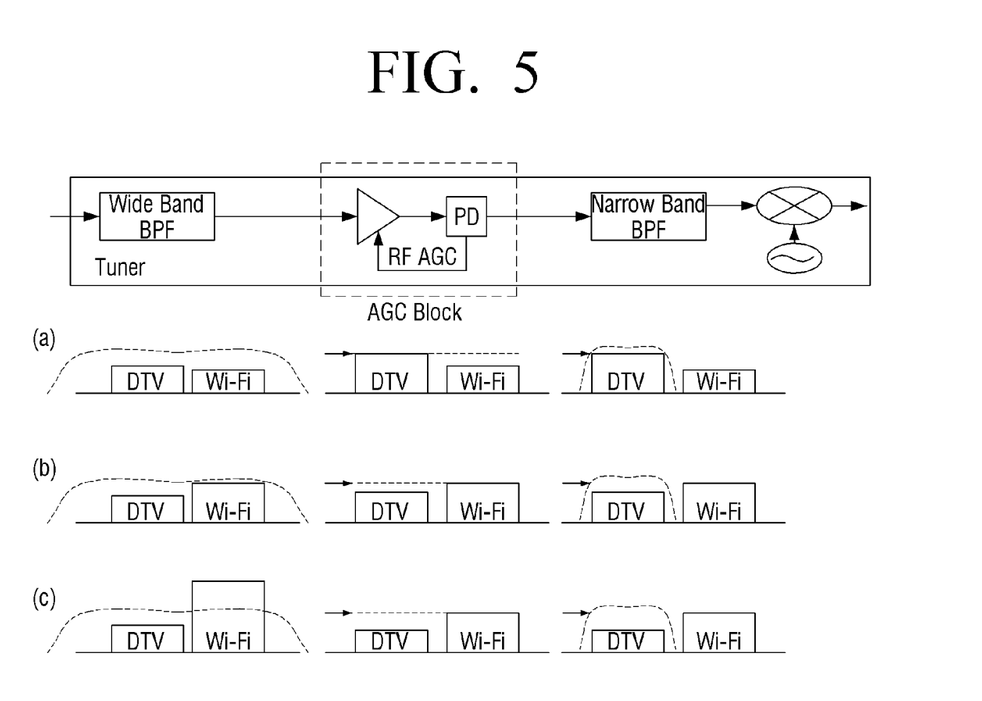
FIG. 5 is a view to illustrating an effect of a communication method according to an exemplary embodiment.

FIG. 5 is a view to illustrate an operation of a communication device according to an exemplary embodiment and a corresponding effect on a broadcast receiving apparatus.

FIG. 5 illustrates a situation in which the communication device 300 establishes communication with a counterpart communication device (not shown) using a TV white space and gradually increases transmission power of a signal (for example, a Wi-Fi signal in the example of FIG. 5) to be transmitted, and the gradually increasing Wi-Fi signal enters a tuner of a TV broadcast receiving apparatus.

The tuner of FIG. 5 is a tuner of a TV broadcast receiving apparatus (for example, a digital TV) as explained in FIG. 2, and, under the wide band filter (Band Pass filter (BPF)) of FIG. 5, the power of the Wi-Fi signal transmitted by the communication device 300 gradually increases in order of (a), (b), and (c) of FIG. 5 and the Wi-Fi signal enters the wide band filter of the tuner along with a broadcast signal (DTV), according to an exemplary embodiment.

The size of the Wi-Fi signal in view (a) of FIG. 5 illustrates a case in which the communication device 300 transmits the signal to the counterpart communication device at the predetermined initial power level, the size of the Wi-Fi signal in view (b) of FIG. 5 illustrates a case in which the transmission power is increased by a predetermined increase range, and the size of the Wi-Fi signal in view (c) of FIG. 5 illustrates a case in which the signal is transmitted at the transmission requirement power level.

In this situation, an Amplifier Gain Control (AGC) block of the TV broadcast receiving apparatus (including an RF amplifier and a power detector) amplifies the Wi-Fi signal and the broadcast signal (DTV) of the communication device 300 passing through the wide band filter through the RF amplifier, and transmits the signals to a narrow band filter, as shown in view (a) of FIG. 5.

In this case, since the size of the Wi-Fi signal is smaller than the size of the broadcast signal (DTV), even when the RF amplifier of the AGC block amplifies the two signals up to an appropriate size that is required to process the broadcast signal (DTV) (as indicated by an arrow), the RF amplifier is not saturated.

The two amplified signals pass through the narrow band filter (BPF) and only the broadcast signal (DTV) is transmitted for a next process.

Thereafter, when the gradually increasing Wi-Fi signal enters the tuner as shown in views (b) and (c) of FIG. 5, the AGC block of the tuner can reduce the gain of the RF amplifier as long as the power increase range of the Wi-Fi signal does not exceed an increment by which the RF amplifier of the tuner of the TV broadcast receiving apparatus can adaptively adjust the gain, and thus the RF amplifier is not saturated.

Hereinafter, a detailed explanation of this will be provided by way of an example.

For example, when the level of appropriate power required to process the broadcast signal to be transmitted to the narrow band filter is 15, the level of saturation power of the RF amplifier is 22, and the size of the broadcast signal of the signals received from the wide band filter is 5, the RF amplifier amplifies the incoming broadcast signal by 10 and transmits the signal of 15 to the narrow band filter.

In this situation, when the transmission signal (for example, the Wi-Fi signal) of the communication device communicating in the TV white space is transmitted in a burst manner at the level of the transmission requirement power level (for example, 17) for communicating with the counterpart communication device, and enters the tuner of the TV broadcast receiving apparatus according to the related-art communication method, the broadcast signal of a 5 level and the Wi-Fi signal of a 17 level pass through the wide band filter and are transmitted to the RF amplifier. Since the RF amplifier amplifies the gain by 10, the RF amplifier should amplify the broadcast signal to the level of 15 and the Wi-Fi signal to the level of 27. However, since the saturation power of the amplifier is 22, the RF amplifier is instantaneously saturated and thus the broadcast signal is also distorted.

However, the communication device communicating in the TV white space according to the exemplary embodiment gradually increases the level of the Wi-Fi signal to 5, 11, and 17, rather than transmitting the Wi-Fi signal to the counterpart communication device at the burst level of 17 (transmission requirement power level).

In this case, when the Wi-Fi signal of the initial power level of 5 enters the TV tuner first, the broadcast signal of the 5 level and the Wi-Fi signal of the 5 level passing through the wide band filter are amplified to the level of 15, respectively, since the RF amplifier has the gain of 10, and are transmitted to the narrow band filter. The narrow band filter filters out only the broadcast signal and the filtered broadcast signal goes through the next process.

Thereafter, when the Wi-Fi signal having the transmission power increased to the level of 11 enters the TV tuner, the broadcast signal of the 5 level and the Wi-Fi signal of the 11 level passing through the wide band filter are amplified to the level of 15 and the level of 21, respectively, when passing through the RF amplifier. Then, only the broadcast signal of the 15 level of the two signals passes through the narrow band filter. In this case, since the Wi-Fi signal is amplified to the level of 21, the AGC block reduces the gain of the RF amplifier from 10 to 4 to maintain the larger one of the two signals at the level of 15.

In this situation, when the Wi-Fi signal increased to the level of 17 (transmission requirement power level) enters the TV tuner, the broadcast signal of the 5 level and the Wi-Fi signal of the 17 level passing through the wide band filter are amplified to the level of 9 and the level of 21, respectively, since the RF amplifier has the gain of a 4 level. After that, only the broadcast signal having the level of 9, from among the two signals, passes through the narrow band filter and goes through the next process.

According to the exemplary embodiment described above, by gradually increasing the transmission power, the AGC block of the TV broadcast receiving apparatus is able to adjust the gain of the RF amplifier and thus saturation of the RF amplifier can be prevented.

In the above example, the transmission power of the communication device is gradually increased from the initial power level of 5 to the transmission requirement power level of 17 by the increase range of 6.

However, when the controller of the communication device increases the transmission power by the increment of 10, as in the above example, the Wi-Fi signal is increased from 5 to 15 directly and the broadcast signal and the Wi-Fi signal are amplified to the level of 15 and the level of 25, respectively, since the RF amplifier amplifies the two signals by the gain of 10. However, since the saturation power of the RF amplifier is 22, saturation occurs. As a result, the AGC block of the tuner of the TV broadcast receiving apparatus does not have an opportunity to reduce the gain.

Accordingly, the increase range by which the AGC block of the tuner of the TV broadcast receiving apparatus adaptively adjusts the gain of the RF amplifier should be set to be less than 6 since the RF amplifier is saturated at the level of 22, and accordingly, the AGC block may have the opportunity to reduce the gain.

As described above, the increment by which the TV broadcast receiving apparatus can adaptively adjust the gain according to the level of the transmission power of the signal transmitted and received through the white space may be appropriately selected and set according to parameters such as the level of the saturation power of the RF amplifier of the tuner of the TV broadcast receiving apparatus and the initial power level of the communication device using the TV white space, so that the RF amplifier cannot be saturated.

On the other hand, referring to views (b) and (c) of FIG. 5, since the size of the Wi-Fi signal is larger than the size of the broadcast signal (DTV), the broadcast signal (DTV), which is amplified by the same gain as that of the Wi-Fi signal through the RF amplifier, becomes smaller than the appropriate size required to process the broadcast signal as indicated by the arrow. However, this does affect performance since the broadcast signal will be amplified in the next process after passing through the narrow band filter.

Accordingly, the communication device and the communication method according to the exemplary embodiments can prevent the phenomenon in which the TV is temporarily rendered inoperable, as in the related-art communication method, in the white space due to the temporary saturation of the RF amplifier of the broadcast receiving apparatus and the subsequent distortion of the broadcast signal.

The above-described problem arising from the related-art communication method in the TV white space may arise not only when the communication device establishes communication with the counterpart communication device, but also when the transmission requirement power is abruptly increased during the communication or when the transmission to the counterpart communication device pauses for a predetermined time and then resumes.

For example, the problem may arise when the user searches a web page through a Wi-Fi terminal and reads it in communication using the TV white space, and then, moves to another page after a certain amount of time, or when the user downloads a file for more than a predetermined time and then abruptly uploads another file.

Accordingly, the exemplary embodiments may also be applied to these situations.

That is, according to another exemplary embodiment, when the transmission requirement power level is changed after the communication between the communication device and the counterpart communication device is established, the communication device performs communication while gradually changing the transmission power, of the signal to be transmitted to the counterpart communication device, from the previous transmission requirement power level to the changed transmission requirement power level, so that saturation of the RF amplifier of the TV broadcast receiving apparatus can be prevented.

This is because that in the related-art communication method, when the transmission requirement power is changed during the communication between the communication device and the counterpart communication device, the transmission is performed in a burst manner at the transmission requirement power changed from the current transmission requirement power, and thus saturation may occur in the RF amplifier of the broadcast receiving apparatus.

In addition, according to another exemplary embodiment, even when the transmission to the counterpart communication device pauses for a predetermined time and then resumes, the transmission power is set to the initial power level again and communication is performed while gradually increasing the transmission power from the initial power level to the transmission requirement power level, so that saturation of the RF amplifier of the TV broadcast receiving apparatus can be prevented.

This is because that in the related-art communication method, when the transmission to the counterpart communication device pauses for a predetermined time during the communication between the communication device and the counterpart communication device and then resumes, the transmission is performed in a burst manner by the transmission requirement power as at the initial time of transmitting of the communication device, and thus saturation of the RF amplifier of the broadcast receiving apparatus may occur.

The predetermined time may be a value that is experimentally set to prevent saturation of the RF amplifier of the broadcast receiving apparatus in the above-described situations, or may be a value that is set according to a communication method or a communication standard of the communication device and the counterpart communication device. However, this is only exemplary and should not be considered as limiting.

Figure 6:
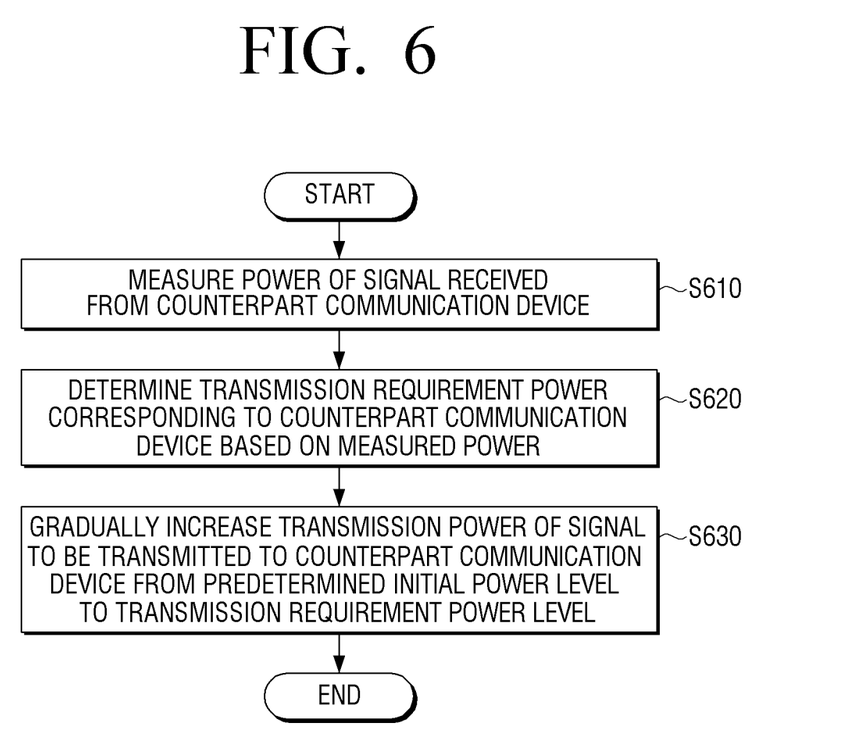
FIG. 6 is a flowchart illustrating a communication method of a communication device according to an exemplary embodiment.

FIG. 6 is a flowchart to illustrate a communication method of a communication device according to an exemplary embodiment. Referring to FIG. 6, the communication device 300 which performs communication using a TV white space may measure power of a signal received from a counterpart communication device (S610). The communication device may determine a transmission requirement power corresponding to the counterpart communication device based on the measured power (S620). The communication device may communicate with the counterpart communication device while gradually increasing transmission power of a signal to be transmitted to the counterpart communication device from a predetermined initial power level to a transmission requirement power level (S630).

The communicating may include communicating with the counterpart communication device while gradually increasing the transmission power from the initial power level to the transmission requirement power level in an increment by which a TV receiving apparatus can adaptively adjust a gain according to a level of transmission power of a signal transmitted and received through the TV white space.

In addition, the communication method of the communication device which communicates using the TV white space may further include, when the transmission requirement power level is changed, communicating while gradually changing the transmission power of the signal to be transmitted to the counterpart communication device from the transmission requirement power level to the changed transmission requirement power level.

In addition, the communication method of the communication device which communicates using the TV white space may further include, when transmission to the counterpart communication device pauses for a predetermined time and then resumes, setting the transmission power to the initial power level again and communicating while gradually increasing the transmission power from the initial power level to the transmission requirement power level.

According to various exemplary embodiments as described above, when the communication device communicates in the white space in the TV broadcast band, the communication device can prevent saturation from occurring in the RF amplifier of the broadcast receiving apparatus and communicate by minimizing an effect on the broadcast reception of the TV broadcast receiving apparatus.

The operation of the controller of the communication device which communicates using the TV white space or the communication methods of the communication device according to the above-described various exemplary embodiments may be generated as software and may be mounted in the communication device.

Specifically, according to an exemplary embodiment, a non-transitory computer readable medium storing a program which, when communication with the counterpart communication device is established using the TV white space, performs communication while gradually increasing the transmission power of the signal to be transmitted to the counterpart communication device from the predetermined initial power level to the transmission requirement power level, may be installed.

The non-transitory computer readable medium refers to a medium that stores data semi-permanently, such as a register, a cache, and a memory, and is readable by an apparatus. Specifically, the above-described various middleware or programs may be stored in a non-transitory computer readable medium such as a compact disc (CD), a digital versatile disk (DVD), a hard disk, a Blu-ray disk, a universal serial bus (USB), a memory card, and a read only memory (ROM), and may be provided.

The foregoing exemplary embodiments and advantages are merely exemplary and are not to be construed as limiting the exemplary embodiments. The exemplary embodiments can be readily applied to other types of apparatuses. Also, the description of the exemplary embodiments is intended to be illustrative, and not to limit the inventive concept as defined by the appended claims, and many alternatives, modifications, and variations will be apparent to those skilled in the art.

What is claimed is:

1. A communication device comprising:
a transceiver configured to communicate with a counterpart communication device using a television (TV) white space;
a measurer configured to measure power of a signal received from the counterpart communication device;
a memory configured to store an initial power level; and
a controller configured to determine a transmission power level based on the power measured by the measurer and control the transceiver to communicate with the counterpart communication device while gradually increasing a transmission power of a signal transmitted to the counterpart communication device from the initial power level to the transmission power level,
wherein, when transmission to the counterpart communication device pauses and then resumes, the controller is further configured to reset the transmission power to the initial power level, and control the transceiver to communicate with the counterpart communication device while gradually increasing the transmission power from the initial power level to the transmission power level.

2. The communication device of claim 1, wherein the controller is further configured to determine a change of the transmission power level and control the transceiver to communicate with the counterpart communication device while gradually changing the transmission power of the signal transmitted to the counterpart communication device from the transmission power level to the changed transmission power level.

3. The communication device of claim 1, wherein the controller is further configured to increase the transmission power from the initial power level to the transmission power level gradually by an increment by which a TV broadcast receiving apparatus adaptively adjusts a gain according to a level of transmission power of a signal transmitted and received through the TV white space between the communication device and the counterpart communication device.

4. A communication method of a communication device using a television (TV) white space, the communication method comprising:
measuring power of a signal received from a counterpart communication device;
determining a transmission power level based on the measured power;
communicating with the counterpart communication device while gradually increasing a transmission power of a signal transmitted to the counterpart communication device from a predetermined initial power level to the transmission power level; and
when transmission to the counterpart communication device pauses and then resumes, resetting the transmission power to the initial power level, and communicating with the counterpart communication device while gradually increasing the transmission power from the initial power level to the transmission power level.

5. The communication method of claim 4, further comprising, determining a change of the transmission power level and communicating with the counterpart communication device while gradually changing the transmission power of the signal transmitted to the counterpart communication device from the transmission power level to the changed transmission power level.

6. The communication method of claim 4, wherein the communicating comprises increasing the transmission power from the initial power level to the transmission power level gradually by an increment by which a TV broadcast receiving apparatus adaptively adjusts a gain according to a level of transmission power of a signal transmitted and received through the TV white space between the communication device and the counterpart communication device.

7. A communication device comprising:
a transceiver configured to communicate with a counterpart communication device through a television (TV) white space frequency band; and
a controller configured to determine a transmission power level and an initial transmission power level corresponding to the counterpart communication device and communicate with the counterpart communication device while gradually increasing a transmission power of a signal transmitted to the counterpart communication device from the initial power level to the transmission power level,
wherein, when transmission to the counterpart communication device pauses and then resumes, the controller is further configured to reset the transmission power to the initial power level, and control the transceiver to communicate with the counterpart communication device while gradually increasing the transmission power from the initial power level to the transmission power level.

8. The communication device of claim 7, wherein the controller is further configured to determine a change of the transmission power level and control the transceiver to communicate with the counterpart communication device while gradually changing the transmission power of the signal transmitted to the counterpart communication device from the transmission power level to the changed transmission power level.

9. The communication device of claim 7, wherein the controller is further configured to increase the transmission power from the initial power level to the transmission power level gradually by an increment by which a TV broadcast receiving apparatus adaptively adjusts a gain according to a level of transmission power of a signal transmitted and received through the TV white space between the communication device and the counterpart communication device.

10. The communication device of claim 7, wherein the controller is further configured to determine the initial power level and the transmission power level based on data stored in the communication device.

11. The communication device of claim 7, wherein the controller is further configured to determine the initial power level and the transmission power level based on a power of a signal received from the counterpart communication device.

12. The communication device of claim 7, wherein a memory and the controller are integrated as a system-on-chip.

13. A communication device comprising:
a transceiver; and
a controller configured to control the transceiver to gradually increase a transmission power of a signal transmitted to a counterpart communication device though a television (TV) white space frequency band from an initial power level to a transmission power level,
wherein, when transmission to the counterpart communication device pauses and then resumes, the controller is further configured to reset the transmission power to the initial power level, and control the transceiver to communicate with the counterpart communication device while gradually increasing the transmission power from the initial power level to the transmission power level.

14. The communication device of claim 13, wherein the controller is further configured to determine the initial power level and the transmission power level.

15. The communication device of claim 14, wherein the controller is further configured to determine the initial power level and the transmission power level based on data related to an operational parameter of the counterpart communication device stored in the communication device.

16. The communication device of claim 14, wherein the controller is further configured to determine the initial power level and the transmission power level based on a power of a signal received from the counterpart communication device.

* * * * *